United States Patent [19]
Tanatani et al.

[11] Patent Number: 4,845,141
[45] Date of Patent: Jul. 4, 1989

[54] WEAR-PROOF PAINT FOR POLYMERS

[75] Inventors: Akira Tanatani; Yasumasa Abiru; Nobumasa Sato; Kaoru Kobayashi, all of Hiroshima, Japan

[73] Assignee: Nishikawa Rubber Co., Ltd., Hiroshima, Japan

[21] Appl. No.: 122,531

[22] Filed: Nov. 6, 1987

Related U.S. Application Data

[63] Continuation-in-part of Ser. No. 904, Jan. 6, 1987, abandoned.

[51] Int. Cl.$^4$ ............................ C08K 5/06; C08K 3/36
[52] U.S. Cl. ..................................... 524/261; 524/267; 524/376; 524/500; 524/507
[58] Field of Search ............... 524/500, 267, 376, 507, 524/261

[56] References Cited

U.S. PATENT DOCUMENTS

| | | | |
|---|---|---|---|
| 4,341,687 | 7/1982 | Ozeki et al. | 524/500 |
| 4,572,871 | 2/1986 | Mabuchi et al. | 524/507 |
| 4,572,872 | 2/1986 | Yamazaki et al. | 524/507 |

FOREIGN PATENT DOCUMENTS

| | | | |
|---|---|---|---|
| 0671842 | 10/1963 | Canada | 524/261 |
| 60-105527 | 6/1985 | Japan | 524/261 |

Primary Examiner—Lewis T. Jacobs
Attorney, Agent, or Firm—Armstrong, Nikaido, Marmelstein, Kubovcik & Murray

[57] ABSTRACT

A wear-proof paint for polymers such as rubber or plastic comprising by weight parts, urethane prepolymer A 100 parts, urethane prepolymer B 20-60 parts, silicon oxide 15-50 parts, carbon 2-6 parts and grease 2-10 parts. The paint is particularly adapted for painting door glass-run, weather strip or wiper of automobiles.

3 Claims, No Drawings

WEAR-PROOF PAINT FOR POLYMERS

This is a continuation-in-part of application Ser. No. 904 filed on Jan. 6, 1987, now abandoned.

BACKGROUND OF THE INVENTION

This invention relates to a wear-proof paint for polymers such as rubber and plastic which are adapted to be used door glass-run of automobiles.

A known wear-proof paint has a base composition including a urethane prepolymer A, urethane prepolymer B, silicon oxide and carbon. The urethane prepolymer A is obtained by the reaction of a polyester resin having hydroxy groups in its terminal and a molecular weight of 1,000 to 3,000, synthesized from a saturated diol having 3 to 8 carbon atoms, an organic dicarboxylic acid having 4 to 10 carbon atoms (or an organic dicarboxylic acid anhydride) and a triol having 3 to 8 carbon atoms with an organic diisocyanate in the molar ratio of NCO/OH of from 1/1.1 to 1/1.4. The urethane prepolymer A has hydroxy groups in its terminal and molecular weights of 4,000 to 9,000. The urethane prepolymer B is obtained by the reaction of a triol having 3 to 8 carbon atoms with an organic diisocyanate having 6 to 14 carbon atoms in the molar ratio of NCO/OH of 2/1. The urethane prepolymer B has isocyanate groups in its terminal or trimer of organic diisocyanate.

In order to give wear-proof function, ingredients such as inorganic particles, organic particles and/or oil are added to the base composition. These ingredients include fluororesin, silicone resin, glass beads, polyethylene, graphite, molybdenum disulfide and polyguanamin resin.

The known wear-proof paint proves to give good wear-proof characteristics under low friction, low loads (less than 1 kg/20 mm$^2$) condition. The paint, however, cannot satisfy wear-proof characteristics under high loads condition.

SUMMARY OF THE INVENTION

It is therefore an object of the present invention to provide a wear-proof paint for polymers, which can satisfy low friction and wear-proof characteristics under high loads condition required by door glass-run, weather strip or wiper of automobiles.

According to the present invention, in order to give wear-proof characteristics to the paint under high loads condition, a grease is added to the base composition of the paint. When articles or component parts such as door glass-run or weather strip painted with the paint according to the invention is exposed under high loads condition, grease may be oozed out from the paint, which will function as a lubricant thereby effectively minimizing friction between the article and a surface to which the article is applied.

In accordance with an aspect of the present invention, there is provided a wear-proof paint for polymers comprising by weight parts, urethane prepolymer A 100 parts, urethane prepolymer B 20-60 parts, silicon oxide 15-50 parts, carbon 2-6 parts and grease 2-100 parts. The urethane prepolymer A is obtained by the reaction of a polyester resin having hydroxy groups in its terminal and a molecular weight of 1,000 to 3,000, synthesized from a saturated diol having 3 to 8 carbon atoms, an organic dicarboxylic acid having 4 to 10 carbon atoms (or an organic dicarboxylic acid anhydride) and a triol having 3 to 8 carbon atoms with an organic diisocyanate in the molar ratio of NCO/OH of from 1/1.1 to 1/1.4. The urethane prepolymer A has hydroxy groups in its terminal and mclecular weights of 4,000 to 9,000. The urethane prepolymer B is obtained by the reaction of a triol having 3 to 8 carbon atoms with an organic diisocyanate having 6 to 14 carbon atoms in the molar ratio of NCO/OH of 2/1. The urethane prepolymer B has isocyanate groups in its terminal or trimer of organic diisocyanate.

Since the paint for polymers of the present invention has wear-proof characteristics under high loads condition (more than 3 kg/20 mm$^2$), it is particularly suited for painting automobile parts such as door glass-run, weather strip or wiper which requires low friction and wear-proof characteristics under wide range of loads condition.

The above and other objects, features and advantages of the present invention will become more apparent from the following description with the appended claims.

DETAILED DESCRIPTION OF THE INVENTION

The paint for polymers according to the present invention comprises by weight parts, urethane prepolymer A 100 parts, urethane prepolymer B 20-60 parts, silicon oxide 15-50 parts, carbon 2-6 parts and grease 2-100 parts. The urethane prepolymer A is obtained by the reaction of a polyester resin having hydroxy groups in its terminal and a molecular weight of 1,000 to 3,000, synthesized from a saturated diol having 3 to 8 carbon atoms, an organic dicarboxylic acid having 4 to 10 carbon atoms (or an organic dicarboxylic acid anhydride) and a triol having 3 to 8 carbon atoms with an organic diisocyanate in the molar ratio of NCO/OH of from 1/1.1 to 1/1.4. The urethane prepolymer A has hydroxy groups in its terminal and molecular weights of 4,000 to 9,000. The urethane prepolymer B is obtained by the reaction of a triol having 3 to 8 carbon atoms with an organic diisocyanate having 6 to 14 carbon atoms in the molar ratio of NCO/OH of 2/1. The urethane prepolymer B has isocyanate groups in its terminal or trimer of organic diisocyanate.

Among the ingredients above listed, the feature of the invention resides in grease which will function as a lubricant by oozing out from the paint when articles or component parts such as door glass-run, weather strip or wiper of automobiles having paints of the present invention is exposed under high loads condition.

Preferably, grease may be a mixture of polyoxypropyleneglycol-monoether and fluororesin powder, a mixture of poly (oxyethylene, oxypropylene) glycolmonoether and fluororesin powder, a mixture of mineral oil and fluororesin powder, a mixture of vegetable oil and fluororesin powder, and mixture of silicone oil and fluororesin powder. In actual use, one of these grease is selected based on temperature, loads condition, etc. For example, for painting a door glass-run of automobiles, silicone grease (fluororesin powder: silicone oil=1:0.7 to 1.4) is particularly suitable and the amount of grease to urethane prepolymer A is preferably 1:2.

Polyurethane is particularly suited for base resin of the paint and polyurethane based on polyesters is preferable in case of painting rubber because it has spreading rate of more than 100%.

Automobile parts such as door glass-run, weather strip or wiper painted with the paint of the present invention has coefficient of friction less than 0.3 between the same and a glass and is not worn out when it is scrubbed by a glass under the loads of 3 kg/20 mm$^2$ more than 20,000 times.

EXAMPLE 1

A paint was prepared having a composition of urethane prepolymer A 100 weight parts, urethane prepolymer B 20 weight parts, silicon oxide 30 weight parts, carbon 4 weight parts and grease 20 weight parts. A door glass-run made of rubber was painted with the paint above prepared and cut into 200 mm test piece.

The test piece was mounted to a flat surface wear testing machine and a wear test was carried out by scrubbing the test piece with a glass under the loads of 3 kg/20 mm$^2$. Coefficient of friction between the test piece and the glass was proved to be less than 0.3 and the test piece was not worn out when it was scrubbed by the glass more than 20,000 times. We call this in the specification as wear-proof charactreistics being more than 20,000 times.

EXAMPLE 2

Compositon of the paint is as follows:
Urethane prepolymer A: 100 wt parts
Urethane prepolymer B: 20 wt parts
Silicon oxide: 30 wt parts
Carbon: 4 wt parts
Grease: 50 wt parts The same wear test as that of Example 1 was carried out and the results were as follows.
Coefficient of friction: less than 0.3
Wear-proof characteristics: more than 30,000 times

EXAMPLE 3

Composition of the paint is as follows:
Urethane prepolymer A: 100 wt parts
Urethane prepolymer B: 20 wt parts
Silicon oxide: 15 wt parts
Carbon: 4 wt parts
Grease: 90 wt parts The same wear test as that of Example 1 was carried out and the results were as follows.
Coefficient of friction: less than 0.3
Wear-proof characteristics: more than 20,000 times

EXAMPLE 4

Composition of the paint is as follows:
Urethane prepolymer A: 100 wt parts
Urethane prepolymer B: 20 wt parts
Silicon oxide: 50 wt parts
Carbon: 4 wt parts
Grease: 5 wt parts The same wear test as that of Example 1 was carried out and the results were as follows.
Coefficient of friction: less than 0.3
Wear-proof characteristics: more than 20,000 times

EXAMPLE 5

Composition of the paint is as follows:
Urethane prepolymer A: 100 wt parts
Urethane prepolymer B: 50 wt parts
Silicon oxide: 15 wt parts
Carbon: 4 wt parts
Grease: 50 wt parts The same wear test as that of Example 1 was carried out and the results were follows.
Coefficient of friction: less than 0.3
Wear-proof characteristics: more than 30,000 times

EXAMPLE 6

Composition of the paint is as follows:
Urethane prepolymer A: 100 wt parts
Urethane prepolymer B: 30 wt parts
Silicon oxide: 30 wt parts
Carbon: 4 wt parts
Grease: 20 wt parts The same wear test as that of Example 1 was carried out and the results were as follows.
Coefficient of friction: less than 0.3
Wear-proof Characteristics: more than 30,000 times

COMPARATIVE EXAMPLE 1

In order to prove effectiveness of the present invention, the following paint without having grease contained therein was prepared and the same wear test as that of Example 1 was carried out.
Urethane prepolymer A: 100 wt parts
Urethane prepolymer B: 20 wt parts
Silicon oxide: 30 wt parts
Carbon: 4 wt parts
Silicone oil: 20 wt parts The results were as follows.
Coefficient of friction: less than 0.4
Wear-proof characteristics: less than 5,000 times

COMPARATIVE EXAMPLE 2

Composition of the paint is as follows:
Urethane prepolymer A: 100 wt parts
Urethane prepolymer B: 20 wt parts
Silicon oxide: 30 wt parts
Carbon: 4 wt parts
Fluororesin: 20 wt parts The same wear test as that of Example 1 was carried out and the results were as follows.
Coefficient of friction: less than 0.3
Wear-proof characteristics: less than 5,000 times

COMPARATIVE EXAMPLE 3

Composition of the paint is as follows:
Urethane prepolymer A: 100 wt parts
Urethane prepolymer B: 20 wt parts
Silicon oxide: 30 wt parts
Molybdenum disulfide: 20 wt parts The same wear test as that of Example 1 was carried out and the results were as follows.
Coefficient of friction: less than 0.3
Wear-proof characteristics: less than 5,000 times

What is claimed is:

1. A wear-proof paint for polymers comprising by weight parts, urethane prepolymer A 100 parts, urethane prepolymer B 20-60 parts, silicone oxide 15-50 parts, carbon 2-6 parts and grease 2-100 parts wherein the urethane prepolymer A is obtained by the reaction of a polyester resin having hydroxy groups in its terminal and a molecular weight of 1,000 to 3,000, synthesized from a saturated diol having 3 to 8 carbon atoms, an organic dicarboxylic acid having 4 to 10 carbon atoms (or an organic dicarboxylic acid anhydride) and triol having 3 to 8 carbon atoms with an organic diisocyanate in the molar ratio of NCO/OH of from 1/1.1 to 1/1.4, wherein the urethane prepolymer A has hydroxy groups in its terminal and molecular weight of 4,000 to 9,000, and wherein the urethane prepolymer B has isocyanate groups in its terminal or trimer of organic diisocyanate and is obtained by the reaction of a triol having 3 to 8 carbon atoms with an organic diisocyanate having 6 to 14 carbon atoms in the molar ratio of NCO/OH of 2/1.

2. A wear-proof paint for polymers according to claim 1 wherein said grease is selected from a group consisting of a mixture of polyoxypropyleneglycol-monoether and fluororesin powder, a mixture of poly (oxyethylene, oxypropylene) glycol-monoether and fluororesin powder, a mixture of mineral oil and fluororesin powder, a mixture of vegetable oil and fluororesin powder, and a mixture of silicone oil and fluororesin powder.

3. A wear-proof paint for polymers according to claim 1 wherein said grease is a mixture of silicone oil and fluororesin powder and wherein ingredients ratio of fluororesin to silicone oil is 1:0.7 to 1.4.

* * * * *